Fig. 2
Fig. 4
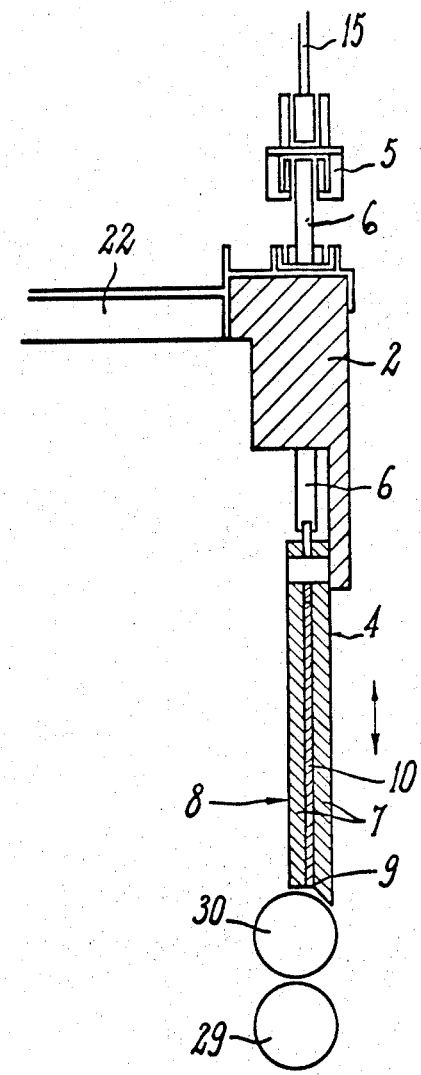
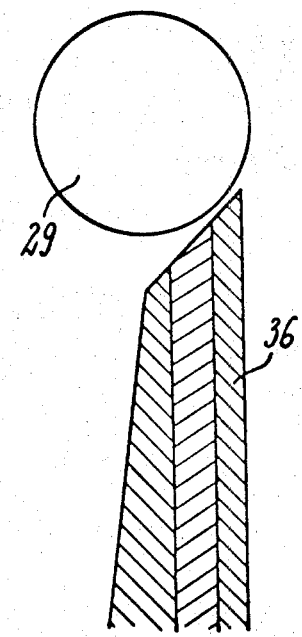

United States Patent Office 3,806,331
Patented Apr. 23, 1974

3,806,331
GLASS HEATING AND TEMPERING
APPARATUS
Albert Bezombes, Paris, France, assignor to Saint-Gobain
Industries, Neuilly-sur-Seine, France
Filed Dec. 15, 1971, Ser. No. 208,361
Claims priority, application France, Dec. 23, 1970,
7046402
Int. Cl. C03b 27/00
U.S. Cl. 65—351                              11 Claims

ABSTRACT OF THE DISCLOSURE

A tunnel system is provided which heats glass plates horizontally for tempering, delivers them to tempering apparatus with more even temperature, in a shorter time, controls temperature between the heating and blowing sections, controls air turbulence at the discharge port of the heating unit, and applies the blowing air on novel principles, producing a more perfectly tempered plate.

---

This invention relates to the tempering of glass, especially flat glass, to tempering methods and apparatus, to tunnel heating furnaces, and to a unitary heating-tempering apparatus embodying apparatus for preventing heat exchange between the hot and cold sections.

It is known to temper flat glass by heating the plates horizontally on a gang of parallel rollers, within a tunnel furnace having ports of admission and discharge for the plates, and with or without bending them, blast them with jets of cold air. In order to achieve the degree of temper desired, particularly for high temper, it is necessary to maintain a temperature sufficiently above the point of transformation (viscosity of $10^{13.3}$ poises form ordinary silica-soda-lime glass) to permit the blowing apparatus to perform its intended function. As it is not feasible to elevate the temperature attained by the glass in the furnace without inducing deformation of the sheets of glass, for instance by sagging between successive conveyor rollers, it has been proposed to put the tempering apparatus close to the port of discharge of the furnace, reducing the time in which the glass can cool before the tempering blasts hit it, but that has had the effect of allowing cold air to enter the discharge end of the furnace where the temperature should be at its optimum upsetting the evenness of temperature of the sheets either at the surface or in depth.

It is important that the distribution of temperature in the glass sheets shall be even to prevent irregular tempering and deformation of the sheets. These difficulties increase as the glass sheets become thinner, because in such cases the spontaneous cooling of the sheets by radiation and convection is very rapid. It is especially true that as the glass is the thinner the regulation of the quantity of air to be used for tempering to a chosen degree of temper becomes more and more important. For example, if one changes from sheets 5 mm. thick to sheets 3 mm. thick the quantity of air blown upon the sheets to produce the same degree of temper is about five times larger. The air turbulence which results at the discharge port is such that one cannot sufficiently block the entrance with known apparatus to provide the necessary uniformity of temperature in the sheet at discharge, even though an asbestos or other refractory flap covers the port.

It is an object of this invention to provide an apparatus in which a tunnel furnace will deliver hot sheets at even temperature, correct for the operation, to tempering apparatus without irregularity, without admission of cold air to the discharge end of the furnace, with control of air turbulence adjacent the port, and to temper more uniformly, thus achieving a superior tempered sheet by the combination of more perfect heating and more perfect tempering.

The objects are accomplished, generally speaking, by establishing a progressively instantaneous transfer of the sheet from the hot zone to the cold zone of tempering apparatus which includes means for transferring the sheet from the hot zone to the cold zone while excluding the entrance of air from the cold zone into the hot zone. The discharge port is comprised of rollers having resilient, compressible coverings between which the sheet passes, the resilience of the coverings closing or substantially closing the port after the passage of each sheet, the rollers being closely approached, above and below, by the lips of an adjustable gate, and being relatively adjustable to establish optimum isolation of the two zones. In addition the tempering section blows linear jets of air transversely against the surfaces of the hot sheet at the discharge port which are aimed away from the port, producing flows of the cooling blasts parallel to the upper and lower surfaces of the glass and away from the port. In this way not only is the cold air directed away from the port, and the port effectively sealed against the turbulence produced by the jets but there may be an actual tendency to draw the hot gases inside the heating section toward the port, the magnitude of which will depend upon the angle and velocity of the jets nearest the port. In addition equality of tempering on opposite sides of the sheet may be further improved by passing the sheet between pairs of rollers in the cooling section, by providing linear jets which extend fully across the width of the sheet, and by providing transversely extending conduits through which the gases flowing parallel to the sheet, which have become heated by contact with it, can escape, being immediately replaced by additional jets of cold air.

The discharge rollers in the port are preferably constructed, as are also the conveyor rollers in the heating and blasting sections, of silica tubes covered by braided sleeves of silica fibers, for instance as described in French Pat. 1,448,278.

In a preferred mode the lower roller is mounted with great precision almost in contact with the lower lip of the port, the upper roller is supported at each extremity by a vertically adjustable bearing which can be adjusted, e.g. with such fineness as to approach the lower roller to within 0.1 mm. The lower roller may be considered as the last of the hot section conveyor. Because of this adjustability the size of the port can be adjusted to the thickness of the glass plates being worked and to furnish optimum obstruction to the entrance of cold air from the blowing section into the furnace. The upper roller may, in certain cases, make actual contact with the glass and even apply some pressure, the resilient sleeve preventing damage to the hot sheet. It has been demonstrated that the position of the adjustable roller with respect to the sheet has the effect of regulating with precision the heat exchange which occurs between the sheet and the roller. An adjustable gate seals off the area of the port above the upper roller.

In prior furnaces of horizontal type equilibrium of temperature between the upper and lower faces of the glass was not perfect because the upper surface was heated largely by radiation while the lower was heated in large part by conduction from the conveyor rollers, leading to inequality of temper.

The present invention compensates for such irregularities. It can be used in various ways of which the following are exemplary:

When the upper roller is spaced from the glass it can be used to admit a controlled quantity of air, from the tempering section, to the furnace to flow over the surface of the glass as it passes through the port;

When it is very close to the sheet it acts by proximity to induce a thermal exchange with the glass by radiation;

When in actual contact with the glass sheet it establishes heat exchange by conduction, the magnitude of which is variable according to the pressure applied and the area of silica sleeve actually contacting the glass;

The size of the gap between the upper lip of the port and the roller can be changed by changing the position of an adjustable gate, forming the upper part of the port, which approaches the surface of the upper roller more or less closely and which can be regulated together with or independently of the adjustment of the upper roller and the upper surface of the glass.

In a preferred form of the invention the distance between the heating zone and the blowing zone is further reduced by reducing the thickness of the wall of the discharge port, which is constructed of two thin refractory plates separated by a plate of insulation having a low coefficient of heat transference instead of the cast refractory of the furnace wall. In order to reduce heat loss still further the face of the wall may be covered with a material which reflects infrared rays.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a schematic view partly in longitudinal, vertical section of a unitary tempering apparatus illustrating the heating and blowing zones and the adjustable separatory wall;

FIG. 2 is a vertical section on enlarged scale through the upper part of the heat barrier port;

FIG. 4 is a part vertical section of the lower closure wall and roller.

Figure 1:
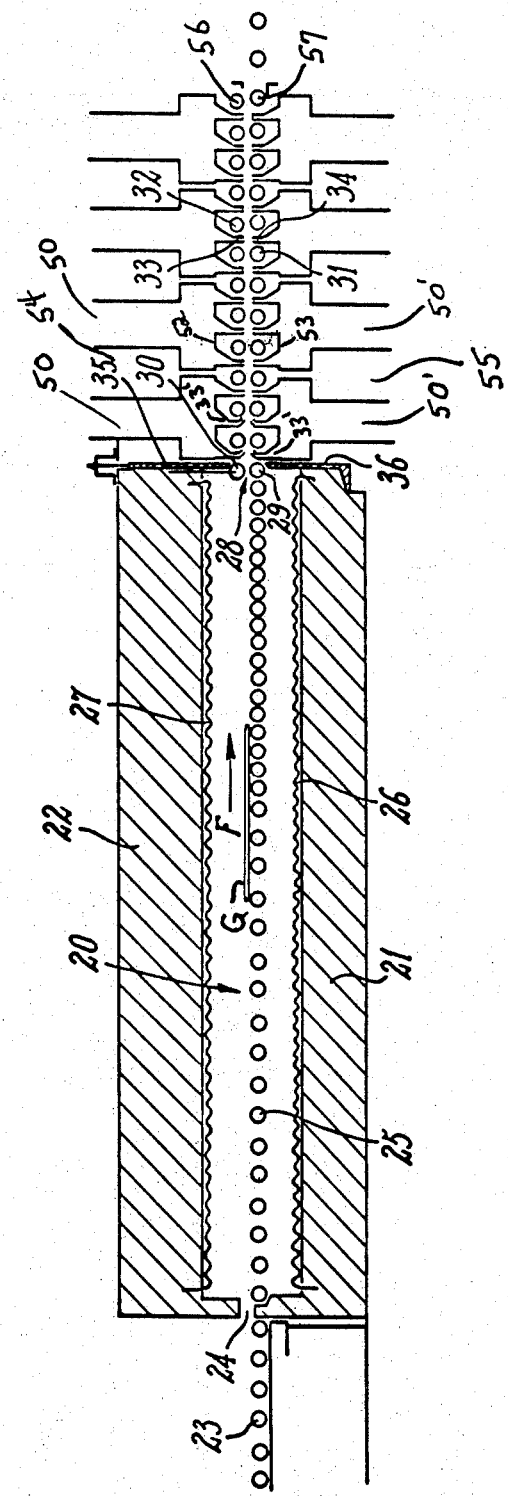

On the drawings 20 designates the heating section including a sole 21 and vault 22. The sheets of glass G enter the furnace through entrance port 24 on the driven rollers 23, 25 of a conveyor, the rollers of which, at the hotter part of the furnace, downstream are almost contiguous to reduce the space between the lines of support and prevent sagging between rollers. The furnace is heated by upper and lower bands of resistances 26, 27 between which the conveyor passes, the upper banks being attached to the vault and the lower to the sole. The glass G travels in the direction of the arrow F at a rate which produces optimum temperature in the glass at the discharge port 28. The conveyor rollers 31, outside the heating section receive the hot glass and transport it through the blowing section in which it is tempered. In this section the lower conveyor rollers are surmounted by a rank of rollers 32 which stabilize the sheet during cooling and equalize the treatment by air. In this section the sheets of hot glass are blown upon by jets of air 33 from above and 34 from below. These jets are provided by a series of linear slots or nozzles extending fully across the width of the sheets of which the upstream nozzles 33' are directed downstream as well as toward the glass, setting up an air flow away from the discharge port of the heating section, eliminating the turbulence at the port characteristic of prior construction and even establishing a mild flow of hot air inside the furnace toward the small gaps in the barrier.

Conduits 50, 50' deliver air at uniform pressure to three nozzles, as shown in FIG. 1, of which the first two are tilted downstream. Each pair of rollers 32, 31 is covered by upper and lower hoods 52, 53 which extend from wall to wall of the blowing enclosure or chamber. Downstream of each group of blowing nozzles is a pair of elongated ports of escape 54, 55 from which the air heated by contact with the hot glass can escape, being replaced by fresh blasts of cold air from succeeding groups of nozzles. In this way the glass as it travels toward the right of the drawing is subjected to successive treatments by linear jets of cold air while heated air continually escapes through linear ports. The upper rollers are also in contact, through their compressible braided sleeves with the upper surface of the glass, keeping it aligned properly and assuring an equal application of air to both surfaces of the glass. The axes of the discharge rollers 30, 56, may be displaced upstream with respect to the axes of lower rollers 29, 57 respectively.

As shown in FIG. 1 the barrier between the heating and tempering zones has two parts of which the upper 35 is a vertically adjustable gate and the lower 36 is fixed. As shown in FIG. 2 the upper part of the barrier has a fixed wall 2 constituting a part of the vault 22, and a mobile gate 4 which is suspended from vertically movable hangers 6 which are suspended in turn from beam 5.

The gate 4 is formed of two relatively thin walls 7, for instance each less than 1 cm. thick composed of some substance having a low coefficient of expansion, e.g. fuse silica. Between these layers is disposed a layer of thermal insulation 10, for example refractory felt. The inner face of the gate is covered by a layer reflective of infrared rays, for instance gold. The total thickness of such a gate is very small, in comparison with the massive masonry of former practice and diminishes the distance between the heat of the furnace and the blast of tempering air, thus eliminating any substantial cooling between the furnace and the tempering blast.

The lower part of the gate has a reentrant angle 9, providing a longer approach to the curvature of the roller and two lines, which aproach it very closely, with a small chamber between them acting to interrupt the passage of air into the furnace. The gate is adjustable to or away from the roller as the hanger rods 6 are in two screw threaded parts which provide very fine adjustment.

Figure 3:
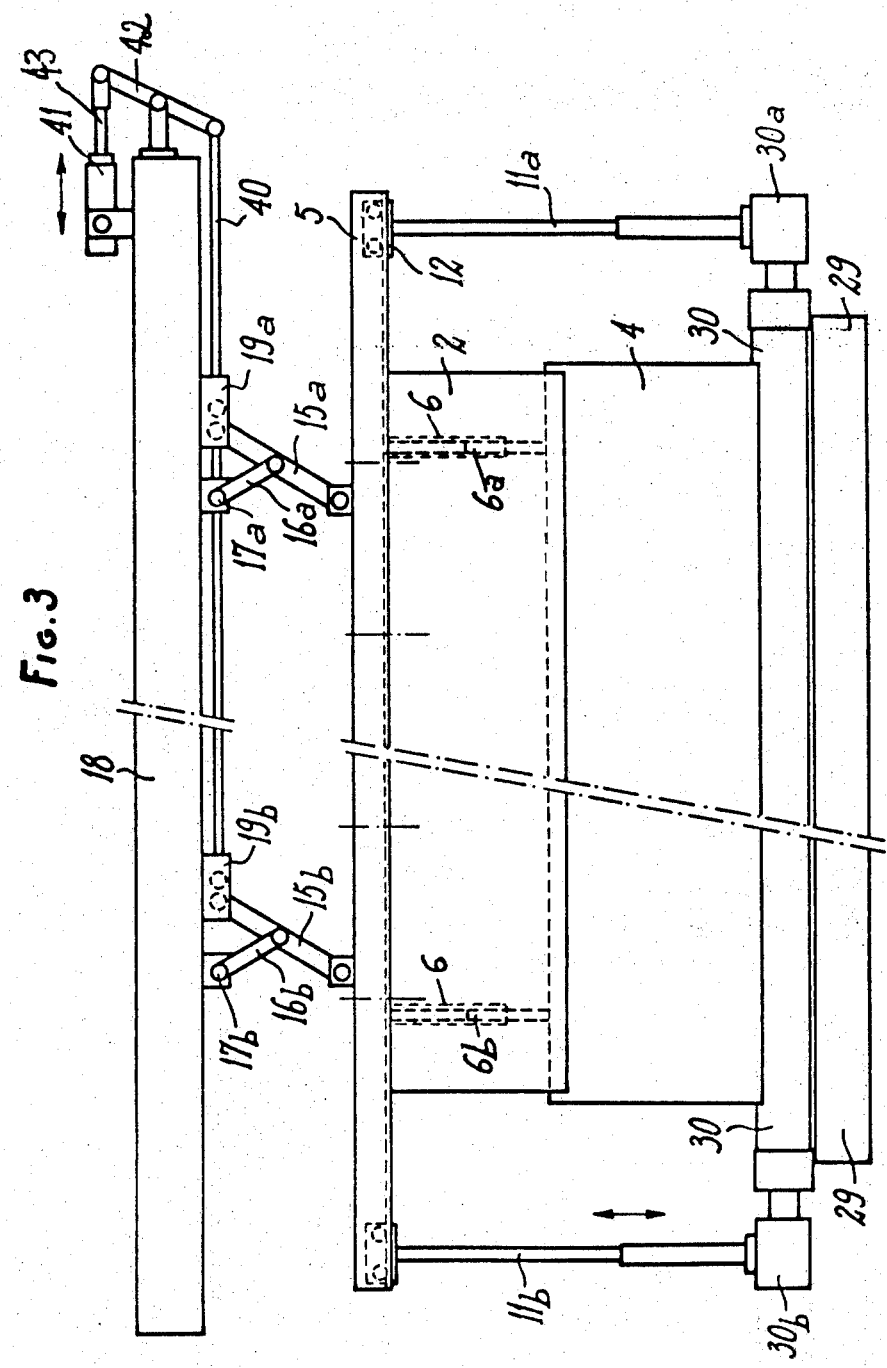
FIG. 3 is a schematic elevation showing construction and an apparatus for adjusting the parts.

In FIG. 3 is shown the wall 2 forming part of the vault, the beam 5 from which the gate 4 is suspended by hanger rods 6a, 6b and the upper roller 30 and its bearings 30a and 30b are suspended by individually adjustable hanger rods 11a and 11b. The beam 5 is adjustable vertically as a unit with the roller 30 and the gate 4 by means of lever arms 15a, 15b pivoted to beam 5 and to sleeves 19a, 19b fixed to rod 40, the end of which is pivoted on the end of a lever 42 the other end of which is pivoted to the end of piston rod 43 which is movable in either direction by the piston in cylinder 41. Pneumatically operable pistons of fine adjustment of position are known. The links 16a, 16b are pivoted to fixed brackets 17a, 17b and to the mid-length of levers 15a, 15b providing fulcrums for their operation of raising or lowering the ensemble including the gate.

In preparing for operation the beam 5 will be lowered until the roller 30 closely approaches the lower roller 29, which may be the last conveyor roller inside the heating section, both being covered by silica sleeves, then the final fine adjustment is made by hand, turning one part of screw threaded hanger rods 11a, 11b within the other until only the least gap is left between the rollers which will accommodate the plates to be processed. The gate 4 will then be vertically adjusted to the position of FIG. 2, losely approaching the surface of the roller, using the adjustable hanger rods 6a, 6b for the purpose.

It will be observed that the lower lip of the gate and the upper lip of the baffle 36 cover portions of the outer faces of their respective rollers. Also, to compensate for assumed irregularities of heating in particular furnaces, the individual adjustability provided for the ends of the roller and the ends of the gate provide in turn to compensate by giving one or the other a position slightly oblique to the horizontal, thus achieving greater evenness of temperature in the glass by estabilshing a difference in temperature across the port of discharge by admitting some air from the tempering side to part of it. The exact alignment of roller 30 is of special importance when the sheets treated are thin.

It will be observed in FIGS. 3 and 2 that the hangers 6 are suspended from trucks 12 which run on tracks formed by flanges in the bottom of beam 5.

By the adjustment of the length of the screw threaded hangers 11a, 11b the roller can be brought into light contact with the surface of the glass, and by adjustment of the gate the sides or a side of angle 9 can be put into light contact with the roller, or either can be positioned to leave a thin gap, according to the effect desired, the optimum positions being determined empirically. For general use the roller is placed slightly apart from the glass, or so as to permit a slight cooling of the upper surface of the glass as it passes the discharge port to equalize its temperature with that of the lower surface. In furnaces such as that of FIG. 1 there is a tendency for the upper surface to be heated by direct radiation while the lower, being blocked off by the bank of rollers, depends for its heating, to a substantial effect, upon contact with the hot surfaces of the rollers. There is thus provided a homogenization of temperature which is not feasible with prior apparatus and which extends throughout the whole surface and thickness of the glass.

When the lever system 41-15a, b is used the gate and roller move together. We have described the adjustment of hangers 6 and 11 as manual, but any other means of adjustment may be employed.

The construction of the lower baffle 36 is similar to that of baffle 4, the diagonal face (FIG. 4) approaching the roller on a tangent which prevents the edge from engaging the resilient sleeve of silica fibers. It is to be understood that other types of sleeve than silica are known, e.g. asbestos, but that they are inferior to silica. It usually suffices to incline the first or first two blowing slots downstream to achieve an adequate directional effect in the cooling air, it being observed that the air in flowing around the rollers cools their surfaces so that they also participate in the cooling effect. An inclination of 45 to 60° from the horizontal is adequate.

As many apparently widely different embodiments of the present invention may be made without departing from the spirit and scope thereof, it is to be understood that the invention is not limited to the specific embodiments.

What is claimed is:

1. Apparatus for the treatment of flat glass comprising a tunnel furnace having ports for the admission and discharge of flat glass, conveyor means extending between the ports, and means to exclude air from entry through the discharge port comprising a port lip closely approaching a roller of the conveyor means from below, an upper roller above said conveyor roller, gate means closely approaching the upper roller from above, means to adjust the spacing of said rollers, and means to adjust the spacing of the upper roller and the gate means.

2. Apparatus according to claim 1 in which said port lip is tangential to the conveyor roller.

3. Apparatus according to claim 1 in which a lip of the gate means has angular configuration with a plurality of surfaces closely approaching the surface of the upper roller.

4. Tempering apparatus for flat glass comprising a heating furnace section, a blowing section, and baffle means, said sections being in juxtaposition and forming a single tunnel the heating and blowing sections of which are closed off from each other by said baffle means, said baffle means including rollers between which the hot glass passes, said rollers having soft surfaces engaging the glass, said baffle means further including adjustable gate means closely approaching the surfaces of the rollers, said blowing section having linear jets adjacent said rollers extending across and directed against the opposite faces of the glass.

5. Apparatus according to claim 4 in which the baffle means comprises thin walls having outer layers of refractory material of low coefficient of expansion enclosing a layer of thermal insulation.

6. Apparatus according to claim 5 in which the thickness of the baffle means is on the order of a centimeter.

7. Apparatus for treating glass sheets comprising a tunnel furnace having a discharge port for said sheets, conveyor means for transporting said sheets through said port, and baffle means for limiting flow of gases through said port comprising upper and lower rollers vertically spaced apart a distance approximating the thickness of the sheets, upper and lower barriers forming an end wall of the furnace, said barriers being vertically spaced to define said port with the adjacent edges thereof in close proximity to said upper and lower rollers, respectively.

8. Apparatus as defined in claim 7 comprising means for mounting said upper roller for vertical adjustment relative to said conveyor roller and said upper barrier.

9. Apparatus as defined in claim 7 comprising means for mounting said upper barrier for vertical adjustment with and relative to said upper roller.

10. Apparatus as defined in claim 7 comprising means for mounting said upper barrier for vertical adjustment relative to said upper roller.

11. Apparatus as defined in claim 7 comprising a tempering tunnel abutting said tunnel furnace, whereby the heated sheets are transported by the conveyor means directly from the furnace into the tempering tunnel without intermediate exposure.

References Cited
UNITED STATES PATENTS

| | | | |
|---|---|---|---|
| 3,672,861 | 6/1972 | Ritter, Jr. et al. | 65—350 |
| 3,674,456 | 7/1972 | Swillinger | 65—182 R |
| 3,293,022 | 12/1966 | Beattie | 65—348 X |
| 1,967,613 | 7/1934 | Genenger | 65—254 |

FOREIGN PATENTS

| | | | |
|---|---|---|---|
| 1,811,435 | 10/1970 | Germany | 65—114 |

A. D. KELLOGG, Primary Examiner

U.S. Cl. X.R.
65—253, 348

UNITED STATES PATENT OFFICE
CERTIFICATE OF CORRECTION

Patent No. 3,806,331  Dated April 23, 1974

Inventor(s) Albert Bezombes

It is certified that error appears in the above-identified patent and that said Letters Patent are hereby corrected as shown below:

Column 1, line 34, for "form" substitute --for--.
Column 4, line 24, for "fuse" substitute --fused--;
 line 67, for "losely" substitute --closely--.
Column 5, line 3, for "temperating" substitute --tempering--.

Signed and sealed this 24th day of September 1974.

(SEAL)
Attest:

McCOY M. GIBSON JR.
Attesting Officer

C. MARSHALL DANN
Commissioner of Patents